(No Model.)

W. T. McGINNIS.
ELECTRICAL EXERCISING APPARATUS.

No. 281,097. Patented July 10, 1883.

Witnesses:
John A. Ellis.
James H. Shaw

Inventor:
William T. McGinnis
By David A. Burr
Attorney

UNITED STATES PATENT OFFICE.

WILLIAM T. McGINNIS, OF NEW YORK, N. Y.

ELECTRICAL EXERCISING APPARATUS.

SPECIFICATION forming part of Letters Patent No. 281,097, dated July 10, 1883.

Application filed March 21, 1883. (No model.)

*To all whom it may concern:*

Be it known that I, WILLIAM T. MCGINNIS, of the city, county, and State of New York, have invented a new and useful Improvement in Electric Batteries and Appliances; and I do hereby declare that the following is a full and exact description thereof, reference being had to the accompanying drawings, and to the letters of reference marked thereon, making a part of this specification.

My invention relates to the combination of a sealed voltaic battery-cell with an induction-coil and rheotome and suitable conducting-strips in a dumb-bell, Indian club, oar, or other apparatus for muscular or hygienic exercise, or for use in the hand.

The object of my invention is to admit of the generation and transmission of a gentle electrical current through the muscles and tissues of the body, simultaneously with their exercise, as they are brought into play by the use of appliances adapted to the purpose.

Figure 1:
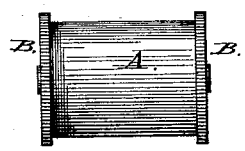
Figure 2:
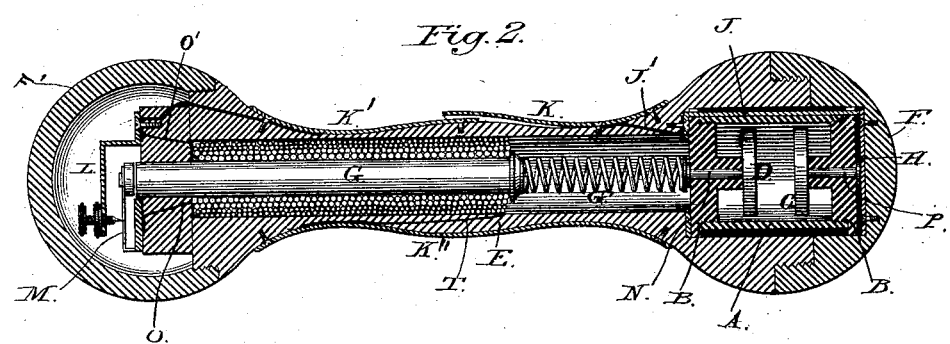
Figure 3:
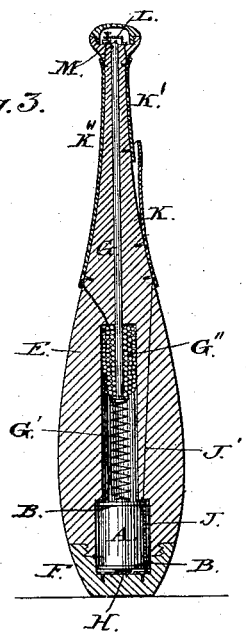

In the accompanying drawings, Figure 1 is an elevation of the sealed galvanic cell used in my invention; Fig. 2, a longitudinal section of a dumb-bell containing at one end the sealed battery-cell and at the other an induction-coil and rheotome, with suitable connections for transmitting the induced current through the hand which grasps the device; and Fig. 3, a longitudinal section upon a smaller scale, illustrating my invention in its application to an Indian club.

A is a cylindrical case or shell, made preferably of hard rubber, gutta-percha, or other insulating material, and fitted at each end with heads or cap-plates B B', which are made to screw into or upon said ends to close and seal the case with a tight joint, so that its contents may not leak out. Upon the inner face of one head, B, is secured a zinc plate, C, connected to a central copper rod or wire, P, extending outwardly therefrom, and to the inner side of its opposite head is secured a carbon plate, D, from which also a central copper rod or wire, N, extends outwardly. The conducting-rods N P each terminate in a suitable exterior plate or button made to project out slightly from the head, as shown in Fig. 1. This cell A is charged by filling it with a semi-fluid paste of bisulphate of mercury, and when its opposite poles, N P, are connected by a suitable conducting medium to form a circuit an electric current is produced, which, owing to the fact that the cell is not only completely closed and sealed, so that its contents may not escape, but that it will work freely in any position until its elements are exhausted, is adapted for many useful and novel applications, as hereinafter described.

In the drawings, Fig. 2, E represents the body of a dumb-bell, made preferably of wood. A central aperture is pierced longitudinally therein, to extend from end to end thereof, and is enlarged at one end to receive an induction-coil, G, and at the other to receive one end of the battery-cell A. A spiral spring, G', is interposed between the induction-coil G and the bottom of the cell A, to confine the latter against a cap-plate, F, which closes the outer end of the body E, and to serve also as a conductor between the pole N of the battery and the coil. The cap-plate F is so fashioned outwardly as to screw upon and form a suitable semi-spherical end for the dumb-bell, and is recessed interiorly to embrace the outer end of the cell A. As the cap F is brought home a copper plate, H, upon its inner face will bear upon the pole P of the cell A, which, when thus confined within the end of the dumb-bell, rests with its opposite pole, N, in contact with the spring G', whose resiliency, as described, serves to maintain a firm contact of the poles of the cell with the metallic conductors at each end. When the cap F is closed, the plate H therein is brought into contact with a lateral conducting-strip, J, which is connected by a wire, J', with an outer longitudinal metallic spring plate or strip, K, laid upon the body of the dumb-bell to extend about midway its length, as shown in Fig. 2. The free end of this strip K overlaps a second strip, K', extending thence to the opposite end of the body E, where it connects by means of a wire with the arm L of a rheotome secured upon this end of the body E, over the end of the central core of the induction-coil G. The vibrating armature M of the rheotome is connected by a conducting-wire, O, with the inner coil of the magnet. A second wire, O', connects the strip K' with one end of the outer coil. A longitudinal strip of copper, K'', is placed exteriorly upon the body E, opposite the strips K K', and connected by a wire, T, with said opposite end of the outer coil. The end of the dumb-bell carrying the rheotome L M is finished and the rheotome inclosed by means of a partially-spherical cap, F, which screws upon the end of the body G, as shown in Fig. 1. When the dumb-bell is made of metal, the conducting-wires are covered with insulating material, and the conducting-strips are separated from the metal by strips of hard rubber or other insulating material.

In operation, when the dumb-bell is grasped in the hand, the circuit is closed by the contact of the strip K with the underlying strip K'. The induced current produced in the induction-coil by the interruption of the current through the vibration of the armature M will flow from the strip K'', connected with one end of the coil, to the plate K', connected with its opposite end, and, passing through the hand grasping the two plates, will exercise its electric influence upon the muscles and tissues.

Fig. 2 illustrates the application of my cell and rheotome to an Indian club, the cell A being placed in the base of the club and suitably connected with the induction-coil G and with the rheotome L M in the upper end of the handle. The circuit is closed by the grasp of the hand upon the strips K, K', and K'' on either side of the handle, which are so connected by conducting-wires with the cell, coil, and rheotome, substantially in manner as hereinbefore described, as to transmit the induced current through the operator's hand.

My invention admits of application to an oar, or the handle of a rowing or exercising machine, or other appliance adapted to be grasped in the hand, and I contemplate all such uses and modification thereof.

I claim as my invention—

The combination of a sealed voltaic cell, A, an induction-coil, G, and a vibrating rheotome, L M, inclosed within the body or handle of a dumb-bell or other apparatus adapted for manual use, with conducting surfaces or strips K K' K'', secured upon the handle in position to be clasped by the hand, and wires connecting the cell, coil, and rheotome with each other and with said strips K K' K'', all substantially in the manner and for the purpose herein set forth.

In testimony whereof I have signed my name to this specification in the presence of two subscribing witnesses.

WILLIAM T. McGINNIS.

Witnesses:
 JAMES H. SHAW,
 A. B. MOORE.